United States Patent
Sommer et al.

(10) Patent No.: US 9,567,423 B2
(45) Date of Patent: Feb. 14, 2017

(54) LOW-VISCOSITY POLYURETHANE ACRYLATE DISPERSIONS

(75) Inventors: Stefan Sommer, Leverkusen (DE); Thorsten Rische, Columbus, GA (US); Erhard Luehmann, Bomlitz (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 13/516,853

(22) PCT Filed: Dec. 13, 2010

(86) PCT No.: PCT/EP2010/069453
§ 371 (c)(1),
(2), (4) Date: Jun. 18, 2012

(87) PCT Pub. No.: WO2011/073116
PCT Pub. Date: Jun. 23, 2011

(65) Prior Publication Data
US 2012/0259065 A1    Oct. 11, 2012

(30) Foreign Application Priority Data

Dec. 19, 2009  (EP) ................................. 09015763
Apr. 29, 2010  (EP) ................................. 10004513

(51) Int. Cl.
*C08G 18/08* (2006.01)
*C08G 18/12* (2006.01)
*C08G 18/67* (2006.01)
*C08G 18/75* (2006.01)
*C08G 18/73* (2006.01)
*C08G 18/68* (2006.01)
*C08G 18/62* (2006.01)

(52) U.S. Cl.
CPC ....... *C08G 18/0823* (2013.01); *C08G 18/0866* (2013.01); *C08G 18/12* (2013.01); *C08G 18/6225* (2013.01); *C08G 18/6229* (2013.01); *C08G 18/672* (2013.01); *C08G 18/6705* (2013.01); *C08G 18/6795* (2013.01); *C08G 18/68* (2013.01); *C08G 18/73* (2013.01); *C08G 18/755* (2013.01); *C08G 18/758* (2013.01)

(58) Field of Classification Search
CPC . C08G 18/0823; C08G 18/12; C08G 18/6795; C08G 18/758; C08G 18/6705; C08G 18/755; C08G 18/73; C08G 18/68; C08G 18/0866; C08G 18/6229; C08G 18/6225; C08G 18/672
USPC .................... 524/507, 591, 839, 840; 528/71
See application file for complete search history.

(56) References Cited

U.S. PATENT DOCUMENTS

| | | |
|---|---|---|
| 5,684,081 A | 11/1997 | Dannhorn et al. |
| 6,100,326 A | 8/2000 | Richter et al. |
| 6,207,744 B1 | 3/2001 | Paulus et al. |
| 6,960,639 B2 | 11/2005 | Weikard et al. |
| 2002/0198314 A1 | 12/2002 | Meisenburg et al. |
| 2003/0228424 A1 | 12/2003 | Dove et al. |
| 2008/0135171 A1 | 6/2008 | Gruber et al. |
| 2008/0145563 A1 | 6/2008 | Heischkel et al. |
| 2008/0194775 A1* | 8/2008 | Blum et al. .................. 525/452 |
| 2009/0269589 A1 | 10/2009 | Sommer et al. |
| 2010/0210757 A1* | 8/2010 | Sommer et al. .............. 523/402 |

FOREIGN PATENT DOCUMENTS

| | | |
|---|---|---|
| CA | 2159265 A1 | 3/1996 |
| DE | 3316592 A1 | 11/1984 |
| DE | 4040290 A1 | 7/1992 |
| DE | 102008000478 A1 | 9/2008 |
| EP | 704469 A2 | 4/1996 |
| EP | 753531 A1 | 1/1997 |
| EP | 0872502 A1 | 10/1998 |
| EP | 0928799 A1 | 7/1999 |
| EP | 0942022 A1 | 9/1999 |
| EP | 1845143 A1 | 10/2007 |
| EP | 2113523 A2 | 11/2009 |
| RU | 2311968 C2 | 12/2007 |
| RU | 2324718 C2 | 5/2008 |
| WO | WO-01/42329 A1 | 6/2001 |
| WO | WO-2005/118689 A1 | 12/2005 |
| WO | WO-2006/089935 A1 | 8/2006 |
| WO | WO-2006/138557 A2 | 12/2006 |

OTHER PUBLICATIONS

International Search Report for PCT/EP2010/069453 mailed Jun. 16, 2011.
Shao-Xiong et al., "Polyurethane Adhesive", *Chemical Industry Press*, 1st Ed., Section 7.3.2, pp. 254-255 (1998).

* cited by examiner

*Primary Examiner* — Rabon Sergent
(74) *Attorney, Agent, or Firm* — Drinker Biddle & Reath LLP

(57) ABSTRACT

The present invention relates to a process for the preparation of low-viscosity, radiation-curable, aqueous dispersions based on polyurethane acrylates (UV-PUDs), wherein the UV-PUDs hydrophilized via hydroxy-functionalized carboxylic acids have a lower initial viscosity when a large part of the urethanization, that is to say the reaction of the NCO-functionalized compounds with the OH-functionalized compounds, initially takes place in the absence of the acid-carrying compounds and the incorporation of the acid-carrying compounds via their hydroxyl function takes place as late as possible.

13 Claims, No Drawings ized polyurethane (meth)acrylate dispersions and radiation-curable allophanate-containing polyurethane (meth)acrylates.

LOW-VISCOSITY POLYURETHANE ACRYLATE DISPERSIONS

RELATED APPLICATIONS

This application is a national stage application (under 35 U.S.C. §371) of PCT/EP2010/069453, filed Dec. 13, 2010, which claims benefit of European Patent Application No. 09015763.7, filed Dec. 19, 2009, and European Patent Application No. 10004513.7, filed Apr. 29, 2010.

In recent years, considerable efforts have been made to convert radiation-curable polyurethane acrylates into water-based polyurethane acrylate dispersions, referred to as UV-PUDs hereinbelow. The advantage of UV-PUDs over conventional, solvent-containing or 100% polyurethane acrylates is the low content of volatile organic compounds (VOCs) with, at the same time, a low viscosity of the binder. For aqueous UV-PUDs, the dependency of the viscosity on the molecular weight of the polyurethane acrylate is broken. Of all the radiation-curable binder types, the low viscosity gives the aqueous UV-PUDs an indisputable advantage when used for spraying.

In general, UV-PUDs are hydrophilised via potentially ionic groups, that is to say groups which can be converted into ionic groups by neutralisation, via ionic groups, or via ionic groups in the presence of hydrophilic polyether groups. Proven processes for the preparation of UV-PUDs are the prepolymer mixing process and the solvent process.

In the prepolymer mixing process, the polymer is prepared in the melt or in the presence of high-boiling solvents, preferably 3,5-dimethylpyrazole, and, after incorporation and optionally neutralisation of the potentially ionic groups, is dispersed by the addition of water. This process is limited substantially to low molecular weights in order to keep the viscosity in the melt low. The use of high-boiling solvents is undesirable for legal reasons.

In the solution process, the polymer is prepared in a low-boiling solvent, often acetone (acetone process). After incorporation and optionally neutralisation of the potentially ionic groups in the polymer, dispersion is carried out by the addition of water and, if it has not yet taken place, chain extension is effected by means of amines. The solvent can subsequently be removed from the polymer by distillation and fed back to the process again. The advantage of this process is that polymers having a high molecular weight can also be prepared.

The process for the synthesis of polyurethane dispersions is generally known, see, for example, Methoden der Organischen Chemie, Houben-Weyl, 4th Edition, Volume E20/Part 2, p. 1659 ff, Georg Thieme Verlag, Stuttgart, 1987.

By far the most widely used, synthetically incorporable hydrophilising agents for UV-PUDs are hydroxycarboxylic acids, for example dimethylolpropionic acid and hydroxypivalic acid.

Known hydrophilising reagents for non-radiation-curable polyurethane dispersions, in addition to hydroxycarboxylic acids, are also aminocarboxylic acids and aminosulfonic acids, for example the sodium salt of the Michael adduct of ethylenediamine to acrylic acid (PUD salt), 2-(2-aminoethylamino)-ethanesulfonic acid and (cyclohexylamino)propane-1-sulfonic acid (Methoden der Organischen Chemie, Houben-Weyl, 4th Edition, Volume E20/Part 2, p. 1662 ff, Georg Thieme Verlag, Stuttgart, 1987). On account of the amine function, they are preferably employed at the end of the synthesis, similarly to the diamines used in the chain extension. The literature contains only a very few examples of radiation-curable polyurethane dispersions in which aminocarboxylic acids or aminosulfonic acids are used. Comparison Examples 7) and 8) in this application clearly show the problems which can occur when aminocarboxylic acids or aminosulfonic acids are used in radiation-curable polyurethane dispersions. UV-PUDs hydrophilised in this manner are often either irreversibly highly viscous or settle out immediately after the dispersion.

Regardless of the process used, it is often found that UV-PUDs hydrophilised via hydroxycarboxylic acids, that is to say via potentially ionic groups, exhibit an increased viscosity immediately after the synthesis. The higher the initial viscosity of the dispersion, the greater the fall in the viscosity over the subsequent days and weeks following the synthesis. There was, therefore, a general need to provide water-based, radiation-curable polyurethane acrylate dispersions with a constant and preferably low viscosity, because the preparation of lacquers, for example, uses thickeners that are adjusted to a defined viscosity of the UV-PUDs. As well as determining the quality of the dispersion, storage tests at elevated temperature are carried out, inter alia, whereby the viscosity of the UV-PUDs must not fall too greatly.

EP-A 753 531 describes urethane acrylate dispersions based on hydroxyl-group-containing polyester and polyepoxy acrylates. Of the many processes mentioned, the acetone process is preferred. The reaction of the compounds having a dispersing action, component B), inter alia hydroxycarboxylic acids, takes place from the beginning of the urethanisation.

EP-A 942 022 describes urethane acrylate dispersions based on hydroxyl-group-containing polyester, polyether or polyurethane acrylates in combination with polyepoxy acrylates. A large number of processes are mentioned for the preparation of the dispersions. The reaction of the compounds having a dispersing action, component B), inter alia hydroxycarboxylic acids, takes place from the beginning of the urethanisation.

Aqueous, radiation-curable polyurethane dispersions based on hydroxyl-group-containing polyester or polyether acrylates are found in EP-A 872 502. The incorporation of the compounds having a dispersing action, component g), inter alia hydroxycarboxylic acids, takes place from the beginning of the urethanisation.

WO-A 2006089935 describes urethane acrylate dispersions based on NCO-containing allophanate acrylates in combination with hydroxyl-group-containing acrylate monomers and/or with hydroxyl-group-containing polyepoxy, polyester, polyether, polyurethane or polycarbonate acrylates. In all the examples given, the reaction of the compounds having a dispersing action, component d), inter alia hydroxycarboxylic acids, takes place from the beginning of the urethanisation.

WO-A 2006138557 describes urethane acrylate dispersions based on hydroxyl-group-containing polyepoxy, polyester, polyether or polyurethane acrylates in combination with hydroxyalkyl acrylates. A large number of processes are mentioned for the preparation of the dispersions. The reaction of the compounds having a dispersing action, component c), inter alia hydroxycarboxylic acids, takes place from the beginning of the urethanisation in the examples given.

EP-A 1845143 describes urethane acrylate dispersions based on dihydroxy-functional acrylates in combination with monohydroxy-functional acrylates. The hydrophilic compound, component (iii), inter alia hydroxycarboxylic acids, is reacted from the beginning of the urethanisation.

EP-A 2113523 describes blocking-resistant radiation-cur-able coating systems based on high molecular weight, aqueous polyurethane dispersions. The reaction of component (A) having a dispersing action, inter alia hydroxycarboxylic acids, takes place from the beginning of the urethanisation in the examples given.

WO-A 01/42329 describes aqueous polyurethane dispersions containing blocked isocyanate groups, in which the polyurethane is composed of aliphatic polyisocyanates, compounds having isocyanate-reactive functional groups and having bonds activatable by actinic radiation, low molecular weight aliphatic compounds having isocyanate-reactive functional groups, compounds having isocyanate-reactive functional groups and dispersing functional groups, and neutralising agents for the dispersing functional groups. In the examples there is described an isocyanate-terminated polyurethane acrylate (NCO prepolymer) which is prepared from hexamethylene diisocyanate and 2-hydroxy acrylate and is reacted in a second step with thioglycolic acid to form a different isocyanate-terminated prepolymer. No polymeric compounds such as polyester (meth)acrylates, polyether (meth)acrylates, polyether ester (meth)acrylates, unsaturated polyesters having allyl ether structural units, or polyepoxy (meth)acrylates are disclosed.

WO-A 2005/118689 describes radiation-curable multi-layer sheets or films. Example 5 of that application describes the preparation of an aqueous dispersion in which a polyesterol, acrylate monomers, isocyanates and urethanisation catalyst are reacted. Glycolic acid is then added. Among the compounds having at least one copolymerisable unsaturated group there are listed only monomeric compounds but not polymeric compounds such as polyester (meth)acrylates, polyether (meth)acrylates, polyether ester (meth)acrylates, unsaturated polyesters having allyl ether structural units, or polyepoxy (meth)acrylates.

In EP-A 704 469, organic polyisocyanates are reacted in one reaction step with polyester polyols and compounds having at least one group reactive towards isocyanate and at least one copolymerisable, unsaturated group. Among the compounds having at least one group reactive towards isocyanate and at least one copolymerisable unsaturated group there are listed only monomeric compounds but not polymeric compounds such as polyester (meth)acrylates, polyether (meth)acrylates, polyether ester (meth)acrylates, unsaturated polyesters having allyl ether structural units, or polyepoxy (meth)acrylates. The reaction with compounds having at least one group reactive towards isocyanate and at least one carboxyl group or carboxylate group preferably takes place at the end. There are described as compounds having at least one group reactive towards isocyanate and at least one carboxyl group or carboxylate group preferably aminocarboxylic acids, particularly preferably PUD salt (Michael adduct of acrylic acid and ethylenediamine), which, like the diamines in the chain extension reaction, are generally added at the end of the reaction. The use of aminocarboxylic acids generally yields highly viscous UV-PUDs (see also Comparison Example 7 in this application and Example 1 in EP-A 704 469).

It was an object of the present invention to provide a process for the synthesis of UV-PUDs in which the aqueous, radiation-curable polyurethane dispersion as binder is formed directly after the synthesis with a lower viscosity than in processes known hitherto.

Surprisingly, it has been found that UV-PUDs hydrophilised via hydroxy-functionalised carboxylic acids have a lower initial viscosity if a large part of the urethanisation, that is to say the reaction of the NCO-functionalised compounds with the OH-functionalised compounds, initially takes place in the absence of the acid-carrying compounds, and the incorporation of the acid-carrying compounds via their hydroxyl function takes place as late as possible. Such dispersions exhibit a markedly lower viscosity after preparation than those in which the acid-functionalised components were added at the beginning of the urethanisation. Further advantages are that the amount of acid can be reduced without the mean particle diameter becoming larger. As a result of the absence of the acid, the reaction time to the end of the urethanisation is markedly shorter. The times for which the reactors are occupied and the production costs can be reduced accordingly.

The invention relates to a process for the preparation of radiation-curable, aqueous dispersions based on polyurethane acrylates (i) containing as structural components A) one or more polymeric compounds selected from the group consisting of polyester (meth)acrylates, polyether (meth)acrylates, polyether ester (meth)acrylates, unsaturated polyesters having allyl ether structural units, and polyepoxy (meth)acrylates having an OH number in the range from 15 to 300 mg KOH/g of substance, B) optionally one or more monomeric compounds other than A) having a hydroxy function and at least one (meth)acrylate group, C) one or more compounds other than A) or B) having at least one group reactive towards isocyanate, D) one or more organic polyisocyanates, E) one or more compounds having at least one hydroxy function and in addition at least one carboxylic acid or carboxylate function, which compounds have a dispersing action for the polyurethane dispersion, F) compounds other than A) to E) having at least one group reactive towards isocyanate, characterised in that components A) to D) are reacted in a first reaction step to form a polyurethane acrylate which contains neither ionic nor potentially ionic groups and, after determination of the NCO content, an NCO value is reached which can differ from the theoretical NCO content by up to 1.5 wt. % NCO (absolute), preferably by up to 1.0 wt. % NCO (absolute), particularly preferably by up to 0.7 wt. % NCO (absolute), and in a second reaction step, component E) is reacted with any free NCO groups from the reaction product of components A) to D) and, after again determining the NCO content, an NCO value is reached which can differ from the theoretical NCO content by up to 1.5 wt. % NCO (absolute), particularly preferably by up to 1.0 wt. % NCO (absolute), and in a third reaction step, component F) is reacted with any free NCO groups.

In order to produce the ionic groups necessary for the dispersion, a neutralising agent is optionally added to the urethane acrylate obtained from components A) to E), before, during or after the preparation of the reaction product of components A) to E), followed by a dispersing step by addition of water to the urethane acrylate or conversion of the urethane acrylate into an aqueous initial charge, a chain extension by means of component F) taking place in a third reaction step before, during or after the dispersion.

The invention also provides a process according to the above description, in which one or more reactive diluents containing at least one radically polymerisable group, component (ii), are added.

Within the scope of this invention, "(meth)acrylate" refers to corresponding acrylate or (meth)acrylate functions or to a mixture of both.

The theoretical NCO value refers to the NCO content that is reached after all the OH-reactive compounds have reacted completely with all the NCO-containing compounds, an excess of NCO-containing compounds being used. In order to monitor the reaction, the NCO content is determined at regular intervals by experiment by means of titration, infrared or near-infrared spectroscopy. It is accordingly possible in a controlled manner to reach after each reaction step, by addition of NCO-reactive compounds, an NCO content that lies within a defined range around the theoretical NCO value. The NCO content determined by experiment can differ from the theoretical NCO content by up to 1.5 wt. % NCO (absolute), that is to say, for example, with a theoretical NCO content of 1.7 wt. %, the NCO content determined by experiment can lie in the range from 3.2 wt. % to 0.2 wt. %. The NCO content determined by experiment can be below the theoretical value when fewer reactive groups, for example urethane groups, react with free NCO. This generally only happens when the more reactive OH-, NH- and/or SH-group-carrying compounds have reacted completely.

In order to prepare the dispersions by the process according to the invention, any processes known from the prior art can be used, such as the emulsifier shear force, acetone, prepolymer mixing, melt emulsification, ketimine and solids spontaneous dispersion processes or derivatives thereof. These methods are known to the person skilled in the art, see, for example, Methoden der Organischen Chemie, Houben-Weyl, 4th Edition, Volume E20/Part 2, page 1659, Georg Thieme Verlag, Stuttgart, 1987. The melt emulsification and acetone processes are preferred. The acetone process is particularly preferred.

In order to prepare the reaction product by the process according to the invention, components A) to C) are placed in the reactor in a first reaction step and optionally diluted with acetone. Component (ii) can optionally also be added to components A) to C). It is likewise possible to add urethanisation catalysts thereto, before the reaction with the polyisocyanate(s) D) takes place. The polyisocyanate(s) D) are then metered in, and the mixture is heated in order to enable the reaction to start. In general, temperatures of from 30 to 60° C. are required therefor. The reverse variant is also possible, in which case the polyisocyanates D) are placed in the reactor and the isocyanate-reactive components A) to C) are added. Components A) to C) can also be added in succession and in any order. Overall, components A) to D) are reacted in a first reaction step until the theoretical NCO value, which can deviate by up to 1.5 wt. % NCO (absolute), preferably by up to 1.0 wt. % NCO (absolute), particularly preferably by up to 0.7 wt. % NCO (absolute), is reached. The addition product so obtained contains neither ionic nor potentially ionic groups. The addition of component E) takes place in a second reaction step, and the reaction is continued until the theoretical NCO value is again reached, which can deviate by up to 1.5 wt. % NCO (absolute), preferably by up to 1.0 wt. % NCO (absolute). Component F) is then optionally reacted with any free NCO groups in a third reaction step.

In order to accelerate the addition to isocyanate, isocyanate addition reaction catalysts, for example triethylamine, 1,4-diazabicyclo-[2,2,2]-octane, tin dioctoate, dibutyltin dilaurate or bismuth octoate, are added, and the mixture is heated in order to enable the reaction to start. Temperatures of from 30 to 60° C. are generally necessary therefor.

The molar ratios of isocyanate groups in D) to groups reactive towards isocyanates in A) to C) are from 1.2:1.0 to 4.0:1.0, preferably from 1.5:1.0 to 3.0 to 1:0.

The molar ratios of isocyanate groups in D) to groups reactive towards isocyanates in A), B), C) and E) are from 1.05:1.0 to 2.5:1.0, preferably from 1.2:1.0 to 1.5:1.0.

After the preparation of the aqueous, radiation-curable polyurethane acrylate (i) from components A) to E) by the process according to the invention, salt formation of the centres of the compounds E) having an ionic dispersing action is carried out, if it was not carried out in the starting molecules. Because component E) according to the process according to the invention contains acidic groups, bases are preferably used, for example triethylamine, ethyldiisopropylamine, dimethylcyclohexylamine, dimethylethanolamine, ammonia, N-ethylmorpholine, LiOH, NaOH and/or KOH.

A reactive diluent (ii) or a mixture of reactive diluents (ii) can then optionally be added. The addition of component (ii) preferably takes place at from 30 to 45° C. As soon as component (ii) has dissolved, the last reaction step is carried out, in which a molar mass increase in the aqueous medium by means of component F) and the formation of the dispersions required for the coating system according to the invention take place. The polyurethane acrylate (i), synthesised from components A) to E), and optionally the reactive diluent(s) (ii), optionally dissolved in acetone, are introduced into the dispersing water containing the amine(s) F) or, conversely, the dispersing water/amine mixture is stirred into the polyurethane solution (i). In addition, the dispersions that are present in the coating system according to the invention form. The amount of amine F) used depends on the unreacted isocyanate groups still present. The reaction of any free isocyanate groups with the amine F) can take place to the extent of from 35% to 150%. In the case where a deficient amount of amine F) is used, any free isocyanate groups react slowly with water. If an excess of amine F) is used, no free isocyanate groups are present and an amine-functional polyurethane acrylate (i) is obtained. Preferably from 80% to 110%, particularly preferably from 90% to 100%, of the free isocyanate groups are reacted with the amine F).

In a further variant it is possible to carry out the molar mass increase by means of the amine F) in the acetone solution, that is to say prior to the dispersion, and optionally before or after the addition of the reactive diluent(s) (ii).

If desired, the organic solvent—where present—can be removed by distillation. The dispersions then have a solids content of from 20 to 60 wt. %, in particular from 30 to 58 wt. %.

It is likewise possible to carry out the dispersion step and the distillation step in parallel, that is to say at the same time or at least partly at the same time.

A further advantage of the process according to the invention is that, if isocyanate addition catalysts are used, the reaction time for synthesis of the polyurethane from components A) to D) of the UV-PUDs is shortened considerably if the incorporation of component E) is delayed, that is to say takes place in a second reaction step.

Structural components A), B) and optionally component (ii) are used in amounts such that the content of copolymerisable double bonds is from 0.5 to 6.0 mol/kg, preferably from 1.0 to 5.5 mol/kg, particularly preferably from 1.5 to 5.0 mol/kg of non-aqueous constituents of the dispersion.

Component (ii) is used in an amount of from 0 to 65 wt. %, preferably from 0 to 40 wt. %, particularly preferably from 0 to 35 wt. %, the sum of components (i) and (ii) being 100 wt. %.

Component A) contains one or more compounds selected from the group consisting of polyester (meth)acrylates, polyether (meth)acrylates, polyether ester (meth)acrylates, unsaturated polyesters having allyl ether structural units, and polyepoxy (meth)acrylates having an OH number in the range from 15 to 300 mg KOH/g of substance.

Of the polyester (meth)acrylates, there are used as component A) the hydroxyl-group-containing polyester (meth) acrylates having an OH number in the range from 15 to 300 mg KOH/g of substance, preferably from 60 to 200 mg KOH/g of substance. In the preparation of the hydroxy-functional polyester (meth)acrylates as component A) there can be used a total of 7 groups of monomer constituents.

The first group (a) contains alkanediols or diols or mixtures thereof. The alkanediols have a molecular weight in the range from 62 to 286 g/mol. Preference is given to alkanediols selected from the group ethanediol, 1,2- and 1,3-propanediol, 1,2-, 1,3- and 1,4-butanediol, 1,5-pentanediol, 1,6-hexanediol, neopentyl glycol, cyclohexane-1,4-dimethanol, 1,2- and 1,4-cyclohexanediol, 2-ethyl-2-butylpropanediol. Preferred diols are diols containing ether oxygen, such as diethylene glycol, triethylene glycol, tetraethylene glycol, dipropylene glycol, tripropylene glycol, polyethylene, polypropylene or polybutylene glycols having a number-average molar mass Mn in the range from 200 to 4000 g/mol, preferably from 300 to 2000 g/mol, particularly preferably from 450 to 1200 g/mol. Reaction products of the above-mentioned diols with ε-caprolactone or other lactones can likewise be used as diols.

The second group (b) contains tri- and higher-hydric alcohols having a molecular weight in the range from 92 to 254 g/mol and/or polyethers started on such alcohols. Particularly preferred tri- and higher-hydric alcohols are glycerol, trimethylolpropane, pentaerythritol, dipentaerythritol and sorbitol. A particularly preferred polyether is the reaction product of 1 mol of trimethylolpropane with 4 mol of ethylene oxide.

The third group (c) contains monoalcohols. Particularly preferred monoalcohols are selected from the group ethanol, 1- and 2-propanol, 1- and 2-butanol, 1-hexanol, 2-ethylhexanol, cyclohexanol and benzyl alcohol.

The fourth group (d) contains dicarboxylic acids having a molecular weight in the range from 104 to 600 g/mol and/or their anhydrides. Preferred dicarboxylic acids and their anhydrides are selected from the group phthalic acid, phthalic anhydride, isophthalic acid, tetrahydrophthalic acid, tetrahydrophthalic anhydride, hexahydrophthalic acid, hexahydrophthalic anhydride, cyclohexanedicarboxylic acid, maleic anhydride, fumaric acid, malonic acid, succinic acid, succinic anhydride, glutaric acid, adipic acid, pimelic acid, suberic acid, sebacic acid, dodecanedioic acid, hydrogenated dimers of the fatty acids as are listed under the sixth group (f).

The fifth group (e) contains trimellitic acid and trimellitic anhydride.

The sixth group (f) contains monocarboxylic acids, for example benzoic acid, cyclohexanecarboxylic acid, 2-ethylhexanoic acid, caproic acid, caprylic acid, capric acid, lauric acid, and natural and synthetic fatty acids, for example lauric, myristic, palmitic, margaric, stearic, behenic, cerotic, palmitoleic, oleic, icosenic, linoleic, linolenic and arachidonic acid.

The seventh group (g) contains acrylic acid, methacrylic acid and/or dimeric acrylic acid.

Suitable hydroxyl-group-containing polyester (meth) acrylates A) contain the reaction product of at least one constituent from group (a) or (b) with at least one constituent from group (d) or (e) and at least one constituent from group (g).

Particularly preferred constituents from group (a) are selected from the group consisting of ethanediol, 1,2- and 1,3-propanediol, 1,4-butanediol, 1,6-hexanediol, neopentyl glycol, cyclohexane-1,4-dimethanol, 1,2- and 1,4-cyclohexanediol, 2-ethyl-2-butylpropanediol, diols containing ether oxygen selected from the group diethylene glycol, triethylene glycol, tetraethylene glycol, dipropylene glycol and tripropylene glycol. Preferred constituents from group (b) are selected from the group glycerol, trimethylolpropane, pentaerythritol, and the reaction product of 1 mol of trimethylolpropane with 4 mol of ethylene oxide. Particularly preferred constituents from groups (d) and (e) are selected from the group phthalic anhydride, isophthalic acid, tetrahydrophthalic anhydride, hexahydrophthalic acid, hexahydrophthalic anhydride, maleic anhydride, fumaric acid, succinic anhydride, glutaric acid, adipic acid, dodecanedioic acid, hydrogenated dimers of the fatty acids as listed under the 6th group (f), and trimellitic anhydride. A preferred constituent from group (g) is acrylic acid.

It is also possible for groups having a dispersing action that are generally known from the prior art optionally to be incorporated into the polyester (meth)acrylates. Accordingly, polyethylene glycols and/or methoxypolyethylene glycols can be used proportionately as the alcohol component. There can be used as compounds alcohol-started polyethylene glycols, polypropylene glycols and their block copolymers, as well as the monomethyl ethers of these polyglycols. Particular preference is given to polyethylene glycol monomethyl ether having a number-average molar mass Mn in the range from 500 to 1500 g/mol.

It is further possible after the esterification to react some of the free, non-esterified carboxyl groups, in particular those of (meth)acrylic acid, with mono-, di- or poly-epoxides. Preferred epoxides are the glycidyl ethers of monomeric, oligomeric or polymeric bisphenol A, bisphenol F, hexanediol and/or butanediol or their ethoxylated and/or propoxylated derivatives. This reaction can be used in particular to increase the OH number of the polyester (meth)acrylate, because an OH group is formed in each case in the epoxide-acid reaction. The acid number of the resulting product is from 0 to 20 mg KOH/g, preferably from 0 to 10 mg KOH/g and particularly preferably from 0 to 5 mg KOH/g of substance. The reaction is preferably catalysed by means of catalysts such as triphenylphosphine, thiodiglycol, ammonium and/or phosphonium halides, and/or zirconium or tin compounds such as tin(II) ethylhexanoate.

The preparation of polyester (meth)acrylates is described on page 3, line 25 to page 6, line 24 of DE-A 4 040 290, on page 5, line 14 to page 11, line 30 of DE-A 3 316 592 and on pages 123 to 135 of P. K. T. Oldring (Ed.) in Chemistry & Technology of UV and EB Formulations For Coatings, Inks & Paints, Vol. 2, 1991, SITA Technology, London.

Likewise suitable as component A) are hydroxyl-group-containing polyether (meth)acrylates which are formed in the reaction of acrylic acid and/or methacrylic acid with polyethers, that is to say, for example, homopolymers, copolymers or block copolymers of ethylene oxide, propylene oxide and/or tetrahydrofuran on any desired hydroxy- and/or amine-functional starter molecules, for example trimethylolpropane, ethylene glycol, propylene glycol, diethylene glycol, dipropylene glycol, glycerol, pentaerythritol, neopentyl glycol, butanediol and hexanediol.

Likewise suitable as component A) are the hydroxyl-group-containing epoxy (meth)acrylates known per se having an OH number in the range from 20 to 300 mg KOH/g, preferably from 100 to 280 mg KOH/g, particularly preferably from 150 to 250 mg KOH/g, or hydroxyl-group-containing polyurethane (meth)acrylates having an OH number in the range from 20 to 300 mg KOH/g, preferably from 40 to 150 mg KOH/g, particularly preferably from 50 to 140 mg KOH/g. Such compounds are likewise described on pages 37 to 56 of P. K. T. Oldring (Ed.), Chemistry & Technology of UV and EB Formulations For Coatings, Inks & Paints, Vol. 2, 1991, SITA Technology, London. Hydroxyl-group-containing epoxy (meth)acrylates are based in particular on reaction products of acrylic acid and/or methacrylic acid with epoxides (glycidyl compounds) of monomeric, oligomeric or polymeric bisphenol A, bisphenol F, hexanediol and/or butanediol or their ethoxylated and/or propoxylated derivatives. Hydroxyl-group-containing epoxy (meth)acrylates also include the addition products of acrylic acid and/or methacrylic acid with epoxides of unsaturated fats (fatty acid triglycerides), for example Photomer® 3005 F (Cognis, Düsseldorf, DE).

Preferred compounds containing unsaturated groups are selected from the group of the polyester (meth)acrylates, polyether (meth)acrylates, polyether ester (meth)acrylates and polyepoxy (meth)acrylates which contain hydroxyl groups in addition to the unsaturated groups.

The compounds listed under component A) can be used on their own or in the form of mixtures.

Component B) contains monohydroxy-functional, (meth)acrylate-group-containing alcohols. Such monohydroxy-functional, (meth)acrylate-group-containing alcohols are, for example, 2-hydroxyethyl (meth)acrylate, caprolactone-extended modifications of 2-hydroxyethyl (meth)acrylate, such as Pemcure® 12A (Cognis, DE), 2-hydroxypropyl (meth)acrylate, 4-hydroxybutyl (meth)acrylate, 3-hydroxy-2,2-dimethylpropyl (meth)acrylate, the on average monohydroxy-functional di-, tri- or penta-(meth)acrylates of polyhydric alcohols such as trimethylolpropane, glycerol, pentaerythritol, ditrimethylolpropane, dipentaerythritol, ethoxylated, propoxylated or alkoxylated trimethylolpropane, glycerol, pentaerythritol, ditrimethylolpropane, dipentaerythritol or commercial mixtures thereof.

In addition, alcohols that can be obtained from the reaction of double-bond-containing acids with optionally double-bond-containing epoxide compounds can also be used as monohydroxy-functional, (meth)acrylate-group-containing alcohols. Preferred reaction products are selected from the group (meth)acrylic acid with glycidyl (meth)acrylate or the glycidyl ester of tertiary, saturated monocarboxylic acid. Tertiary, saturated monocarboxylic acids are, for example, 2,2-dimethylbutyric acid, ethylmethylbutyric acid, ethylmethylpentanoic acid, ethylmethylhexanoic acid, ethylmethylheptanoic acid and/or ethylmethyloctanoic acid.

Particularly preferred monohydroxy-functional, (meth)acrylate-group-containing alcohols are 2-hydroxyethyl (meth)acrylate, 2-hydroxypropyl (meth)acrylate, pentaerythritol triacrylate, dipentaerythritol pentaacrylate and the addition product of ethylmethylheptanoic acid glycidyl ester with (meth)acrylic acid, and commercial mixtures thereof.

2-Hydroxyethyl (meth)acrylate is most particularly preferred.

The monohydroxy-functional, (meth)acrylate-group-containing alcohols B) can be used on their own or in the form of mixtures.

Component C) contains monomeric monools, diols and/or triols in each case having a molecular weight of from 32 to 240 g/mol, for example methanol, ethanol, 1-propanol, 1-butanol, 1-pentanol, 1-hexanol, 2-propanol, 2-butanol, 2-ethylhexanol, ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), diols derived from dimer fatty acids, 2,2-dimethyl-3-hydroxypropionic acid (2,2-dimethyl-3-hydroxypropyl ester), glycerol, trimethylolethane, trimethylolpropane, trimethylolbutane and/or castor oil. Preference is given to neopentyl glycol, 1,4-butanediol, 1,4-cyclohexanedimethanol, 1,6-hexanediol and/or trimethylolpropane.

Component C) further contains oligomeric and/or polymeric, hydroxy-functional compounds. These oligomeric and/or polymeric, hydroxy-functional compounds are, for example, polyesters, polycarbonates, polyether carbonate polyols, C2-, C3- and/or C4-polyethers, polyether esters, polycarbonate polyesters having a functionality of from 1.0 to 3.0, in each case having a weight-average molar mass Mw in the range from 300 to 4000 g/mol, preferably from 500 to 2500 g/mol.

Hydroxy-functional polyester alcohols are those based on mono-, di- and tri-carboxylic acids with monomeric diols and triols, as have already been listed as component B), as well as lactone-based polyester alcohols. The carboxylic acids are, for example, phthalic acid, isophthalic acid, terephthalic acid, trimellitic acid, adipic acid, maleic acid, fumaric acid, tetrahydrophthalic acid, hexahydrophthalic acid, malonic acid, succinic acid, glutaric acid, pimelic acid, suberic acid, sebacic acid, dodecanedioic acid, hydrogenated dimers of fatty acids, as well as saturated and unsaturated fatty acids, for example palmitic acid, stearic acid, myristoleic acid, palmitoleic acid, oleic acid, linoleic acid, linolenic acid, ricinoleic acid and commercial mixtures thereof. The analogous anhydrides of the di- and tri-carboxylic acids can also be used.

Hydroxy-functional polyetherols are obtainable, for example, by polymerisation of cyclic ethers or by reaction of alkylene oxides with a starter molecule.

Hydroxy-functional polycarbonates are hydroxyl-terminated polycarbonates which are obtainable by reaction of diols, lactone-modified diols or bisphenols, for example bisphenol A, with phosgene or carbonic acid diesters, such as diphenyl carbonate or dimethyl carbonate. Hydroxy-functional polyether carbonate polyols are those as described for the synthesis of polyurethane dispersions in DE-A 10 2008 000 478.

Component D) comprises polyisocyanates selected from the group aromatic, araliphatic, aliphatic or cycloaliphatic polyisocyanates or mixtures of such polyisocyanates. Suitable polyisocyanates are, for example, 1,3-cyclohexane diisocyanate, 1-methyl-2,4-diisocyanato-cyclohexane, 1-methyl-2,6-diisocyanato-cyclohexane, tetramethylene diisocyanate, 4,4'-diisocyanatodiphenylmethane, 2,4'-diisocyanatodiphenylmethane, 2,4-diisocyanatotoluene, 2,6-diisocyanatotoluene, α,α,α',α'-tetra-methyl-m- or -p-xylylene diisocyanate, 1,6-hexamethylene diisocyanate, 1-isocyanato-3,3,5-trimethyl-5-isocyanatomethylcyclohexane (isophorone diisocyanate or IPDI), 4,4'-diisocyanato-dicyclohexylmethane, 4-isocyanatomethyl-1,8-octane diisocyanate (triisocyanatononane, TIN) (EP-A 928 799), homologues or oligomers of the listed polyisocyanates with biuret, carbodiimide, isocyanurate, allophanate, iminooxadiazinedione and/or uretdione groups, and mixtures thereof.

Likewise suitable as component D) are compounds having at least two free isocyanate groups, at least one allophanate group and at least one radically polymerisable C=C double bond bonded via the allophanate group, as are described as component a) in WO 2006089935 A1.

As component D), preference is given to 1,6-hexamethylene diisocyanate, 1-isocyanato-3,3,5-trimethyl-5-isocyanatomethylcyclohexane (isophorone diisocyanate or IPDI) and 4,4'-diisocyanatodicyclohexylmethane, homologues or oligomers of 1,6-hexamethylene diisocyanate, 1-isocyanato-3,3,5-trimethyl-5-isocyanatomethylcyclohexane (isophorone diisocyanate or IPDI) and 4,4'-diisocyanato-dicyclohexylmethane with biuret, carbodiimide, isocyanurate, allophanate, iminooxadiazinedione and/or uretdione groups, and mixtures thereof. 4,4'-Diisocyanato-dicyclohexylmethane is most particularly preferred.

Component E) comprises carboxylic-acid- or carboxylate-containing compounds having at least one hydroxy function, which compounds have a dispersing action for the UV-PUDs. If they are carboxylic-acid-containing compounds (potentially anionic groups), they are converted into carboxylate-containing compounds (ionic groups) in the process by salt formation. Component D) is incorporated into the polyurethane via the hydroxy function(s).

As component E), preference is given to mono- and di-hydroxycarboxylic acids selected from the group dimethylolpropionic acid, dimethylolbutyric acid, hydroxypivalic acid, malic acid, citric acid, glycolic acid and lactic acid. Hydroxypivalic acid and dimethylolpropionic acid are particularly preferred as component E).

The acids mentioned under component E) are converted into the corresponding salts by reaction with neutralising agents, such as triethylamine, ethyldiisopropylamine, dimethylcyclohexylamine, dimethylethanolamine, ammonia, N-ethylmorpholine, LiOH, NaOH and/or KOH. The degree of neutralisation is preferably from 50 to 125%. The degree of neutralisation is defined as follows: In the case of acid-functionalised polymers, as the quotient of base and acid; in the case of base-functionalised polymers, as the quotient of acid and base. If the neutralisation is above 100%, more base is added in the case of acid-functionalised polymers than there are acid groups in the polymer; in the case of base-functionalised polymers, more acid is added than there are base groups in the polymer.

The compounds listed under component E) can also be used in mixtures.

In order to increase the molar mass of the polyurethane acrylates (i) according to the invention, mono- and di-amines and/or mono- or di-functional amino alcohols are used as component F). Preferred diamines are those which are more reactive towards the isocyanate groups than water, because the extension of the polyester urethane (meth)acrylate optionally takes place in the aqueous medium. Particularly preferably, the diamines are selected from the group ethylenediamine, 1,6-hexamethylenediamine, isophoronediamine, 1,3-, 1,4-phenylenediamine, piperazine, 4,4'-diphenylmethanediamine, amino-functional polyethylene oxides, amino-functional polypropylene oxides (known by the name Jeffamin® D series [Huntsman Corp. Europe, Zavantem, Belgium]) and hydrazine. Ethylenediamine is most particularly preferred.

Preferred monoamines are selected from the group butylamine, ethylamine and amines of the Jeffamin® M series (Huntsman Corp. Europe, Zavantem, Belgium), amino-functional polyethylene oxides, amino-functional polypropylene oxides and/or amino alcohols.

Component (ii) comprises reactive diluents, which are to be understood as being compounds which contain at least one radically polymerisable group, preferably acrylate and methacrylate groups, and preferably no groups that are reactive towards isocyanate or hydroxy groups.

Preferred compounds (ii) contain from 2 to 6 (meth)acrylate groups, particularly preferably from 4 to 6.

Particularly preferred compounds (ii) have a boiling point of more than 200° C. at normal pressure.

Reactive diluents are described generally in P. K. T. Oldring (editor), Chemistry & Technology of UV & EB Formulations for Coatings, Inks & Paints, Vol. II, Chapter III: Reactive Diluents for UV & EB Curable Formulations, Wiley and SITA Technology, London 1997.

Reactive diluents are, for example, the following alcohols completely esterified with (meth)acrylic acid: methanol, ethanol, 1-propanol, 1-butanol, 1-pentanol, 1-hexanol, 2-propanol, 2-butanol, 2-ethylhexanol, dihydrodicyclopentadienol, tetrahydrofurfuryl alcohol, 3,3,5-trimethylhexanol, octanol, decanol, dodecanol, ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), glycerol, trimethylolethane, trimethylolpropane, trimethylolbutane, pentaerythritol, ditrimethylolpropane, dipentaerythritol, sorbitol, as well as ethoxylated and/or propoxylated derivatives of the listed alcohols and the commercial mixtures formed in the (meth)acrylation of the above-mentioned compounds.

Component (ii) is preferably selected from the group of the (meth)acrylates of tetrols and hexols, such as (meth)acrylates of pentaerythritol, ditrimethylolpropane, dipentaerythritol, sorbitol, ethoxylated, propoxylated or alkoxylated pentaerythritol, ditrimethylolpropane, dipentaerythritol, sorbitol, as well as ethoxylated and/or propoxylated derivatives of the listed alcohols and the commercial mixtures obtained in the (meth)acrylation of the above-mentioned compounds.

The invention also provides the radiation-curable, aqueous dispersions based on polyurethane acrylates (i) prepared by the process according to the invention.

The invention also provides the use of the radiation-curable, aqueous dispersions prepared by the process according to the invention in the production of coatings, in particular of lacquers and adhesives.

After removal of the water by conventional methods, such as heat, thermal radiation, moving, optionally dried air and/or microwaves, the dispersions according to the invention yield clear films. By means of subsequent radiation- and/or radically induced crosslinking, the films cure to give particularly high-quality and chemically resistant lacquer coatings.

Suitable for the radiation-induced polymerisation is electromagnetic radiation whose energy, optionally with the addition of suitable photoinitiators, is sufficient to effect radical polymerisation of (meth)acrylate double bonds.

The radiation-induced polymerisation is preferably carried out by means of radiation having a wavelength of less than 400 nm, such as UV, electron, X-ray or gamma radiation. UV radiation is particularly preferred, curing with UV radiation being initiated in the presence of photoinitiators. In the case of photoinitiators, a distinction is made in principle between two types, unimolecular (type I) and bimolecular (type II). Suitable (type I) systems are aromatic ketone compounds, for example benzophenones in combination with tertiary amines, alkylbenzophenones, 4,4'-bis(dimethylamino)benzophenone (Michler's ketone), anthrone and halogenated benzophenones or mixtures of the mentioned types. Also suitable are (type II) initiators such as benzoin and its derivatives, benzil ketals, acylphosphine oxides, 2,4,6-trimethyl-benzoyl-diphenylphosphine oxide, bisacylphosphine oxides, phenylglyoxylic acid esters, camphorquinone, α-aminoalkylphenones, α,α-dialkoxyacetophenones and α-hydroxyalkylphenones. Preference is given to photoinitiators which can readily be incorporated into aqueous coating compositions. Such products are, for example, Irgacure® 500 (a mixture of benzophenone and (1-hydroxycyclohexyl)phenyl ketone, Ciba, Lampertheim, DE), Irgacure® 819 DW (phenylbis-(2,4,6-trimethylbenzoyl)-phosphine oxide, Ciba, Lampertheim, DE), Esacure® KIP EM (oligo-[2-hydroxy-2-methyl-1-[4-(1-methylvinyl)-phenyl]-propanone], Lamberti, Aldizzate, Italy). Mixtures of these compounds can also be used.

It is also possible to use polar solvents, for example acetone and isopropanol, for the incorporation of the photoinitiators.

The UV curing is advantageously carried out at from 30 to 70° C., because the degree of conversion of (meth) acrylate groups tends to be increased at a higher temperature. This can result in better resistance properties. However, a possible temperature sensitivity of the substrate must be taken into account in the UV curing, so that optimum curing conditions for a particular coating composition/substrate combination are to be determined by the person skilled in the art in simple preliminary tests.

The radiator(s) that initiate(s) the radical polymerisation can be stationary, and the coated substrate is moved past the radiator by means of suitable conventional devices, or the radiators are movable by means of conventional devices, so that the coated substrates are stationary during curing. It is also possible to carry out the irradiation, for example, in chambers, in which the coated substrate is introduced into the chamber, the radiation is then switched on for a specific period of time, and the substrate is removed from the chamber again after the irradiation.

Curing is optionally carried out under an inert gas atmosphere, that is to say with the exclusion of oxygen, in order to prevent inhibition of radical crosslinking by oxygen.

If curing is carried out thermoradically, water-soluble peroxides or aqueous emulsions of water-insoluble initiators are suitable. These radical formers can be combined with accelerators in a known manner.

The UV-PUDs according to the invention can be applied to a very wide variety of substrates by conventional techniques, preferably by spraying, roller application, flooding, printing, knife application, pouring, spread coating and dipping.

In principle, any substrates can be lacquered or coated with the UV-PUDs according to the invention. Preferred substrates are selected from the group consisting of mineral substrates, wood, derived timber products, furniture, parquet, doors, window frames, metal objects, plastics, paper, cardboard, cork, mineral substrates, textiles and leather. They are suitable as a primer and/or as a top coat. In addition, the coating systems according to the invention can also be used in or as adhesives, for example in contact adhesives, in thermoactivatable adhesives or in laminating adhesives.

The UV-PUDs according to the invention can be used on their own or in binder mixtures with other dispersions. These can be dispersions which likewise contain unsaturated groups, for example polyester-, polyurethane-, polyepoxy (meth)acrylate-, polyether-, polyamide-, polysiloxane-, polycarbonate-, epoxy acrylate-, polymer-, polyester acrylate-, polyurethane polyacrylate- and/or polyacrylate-based dispersions containing unsaturated, polymerisable groups.

The coating systems according to the invention can also contain dispersions based on polyesters, polyurethanes, polyethers, polyamides, polyvinyl esters, polyvinyl ethers, polysiloxanes, polycarbonates, polymers and/or polyacrylates that contain functional groups, such as alkoxysilane groups, hydroxy groups and/or isocyanate groups optionally in blocked form. In this manner, dual-cure systems, which can be cured via two different mechanisms, can be produced.

Likewise for dual-cure systems, so-called crosslinkers can further be added to the UV-PUDs according to the invention. Unblocked and/or blocked polyisocyanates, polyaziridines, polycarbodiimides and melamine resins are preferably suitable. Particular preference is given to unblocked and/or blocked, hydrophilised polyisocyanates for aqueous coating compositions. Preferably ≤20 wt. %, particularly preferably ≤10 wt. %, of solid crosslinker, based on the solids content of the coating composition, are added.

It is also possible for the coating systems according to the invention to contain dispersions based on polyesters, polyurethanes, polyethers, polyamides, polysiloxanes, polyvinyl ethers, polybutadienes, polyisoprenes, chlorine rubbers, polycarbonates, polyvinyl esters, polyvinyl chlorides, polymers, polyacrylates, polyurethane polyacrylate, polyester acrylate, polyether acrylate, alkyd, polycarbonate, polyepoxy, epoxy (meth)acrylate that do not contain functional groups. The degree of crosslinking density can thereby be reduced, the physical drying can be influenced, for example accelerated, or elastification or adaptation of the adhesion can be carried out.

It is possible to add to the coating compositions which contain the UV-PUDs according to the invention also amino crosslinker resins based on melamine or urea and/or polyisocyanates having free or blocked polyisocyanate groups, based on polyisocyanates, optionally containing hydrophilising groups, of hexamethylene diisocyanate, isophorone diisocyanate and/or toluylidene diisocyanate with urethane, uretdione, iminooxadiazinedione, isocyanurate, biuret and/or allophanate structures. Carbodiimides or polyaziridines are also possible as further crosslinkers.

Binders, auxiliary substances and additives known in lacquer technology, for example pigments, colourings or mattifying agents, can be added to the coating compositions according to the invention or combined therewith. Such binders, auxiliary substances and additives are flow and wetting additives, slip additives, pigments, including metallic effect pigments, fillers, nanoparticles, light stabilising particles, anti-yellowing additives, thickeners, and additives for reducing the surface tension.

The coating compositions according to the invention are suitable for the coating of films, shaping of the coated film taking place between physical drying and UV curing.

The coating compositions according to the invention are particularly suitable for use as clear lacquers on wood and plastics substrates, in which blocking resistance after physical drying and good resistance to chemicals after radiation curing are important.

The coating compositions according to the invention are also particularly suitable for wood and plastics applications with a pigment content ≥10 wt. %, based on the formulation as a whole. If, owing to high pigment contents, the reaction of the radiation-curable groups in the coating system during radiation curing should be incomplete, blocking-resistant coatings are obtained.

The present invention likewise provides coating compositions containing the radiation-curable, aqueous dispersions according to the invention based on polyurethane acrylate, as well as crosslinkers based on amino resins, blocked polyisocyanates, unblocked polyisocyanates, polyaziridines and/or polycarbodiimides, and/or one or more further dispersions.

This invention further provides substrates coated with the coating compositions according to the invention.

EXAMPLES

Methods

The NCO content was determined in each case according to DIN 53185 by titrimetry.

The solids content was determined according to DIN 53216 by gravimetry after evaporation of all non-volatile constituents.

The mean particle diameter was determined by photon correlation spectroscopy.

The flow time was determined according to DIN 53211 with the aid of a 4 mm DIN beaker.

1) Preparation of a UV-Curable, Aqueous Polyurethane Dispersion (Comparison)

339.9 parts of the polyester acrylate Laromer® PE 44 F (BASF AG, Ludwigshafen, DE), component A), 10.8 parts of 1,4-butanediol, component C), 30.3 parts of dimethylolpropionic acid, component E), 199.7 parts of 4,4'-diisocyanatodicyclohexylmethane, component D), and 0.6 part of dibutyltin dilaurate were dissolved in 185 parts of acetone and reacted at 60° C., with stirring, to an NCO content of 2.1 wt. % (theory 1.72 wt. %). Neutralisation was then carried out by adding and stirring in 19.4 parts of triethylamine. The clear solution was introduced, with stirring, into 900 parts of water. A mixture of 10.8 parts of ethylenediamine, component F), and 24.0 parts of water was then added to the dispersion, with stirring. Thereafter, the acetone was removed from the dispersion by distillation under a slight vacuum. A UV-curable, aqueous polyurethane dispersion 1) having a solids content of 40 wt. %, a mean particle diameter of 90 nm, a pH value of 8.7 and a flow time of 39 seconds was obtained. The acid number of the polyurethane acrylate was 17.5. Reaction time to neutralisation: 15 hours.

2) Preparation of a UV-Curable, Aqueous Polyurethane Dispersion According to the Invention 339.9 parts of the polyester acrylate Laromer® PE 44 F (BASF AG, Ludwigshafen, DE), component A), 10.8 parts of 1,4-butanediol, component C), 199.7 parts of 4,4'-diisocyanatodicyclohexylmethane, component D), and 0.6 part of dibutyltin dilaurate were dissolved in 185 parts of acetone and reacted at 60° C., with stirring, to an NCO content of 4.7 wt. % (theory 4.37 wt. %). 30.3 parts of dimethylolpropionic acid, component E), were then added and reacted further at 60° C. to an NCO value of 2.1 wt. % (theory: 1.72 wt. %). Neutralisation was then carried out by adding and stirring in 19.4 parts of triethylamine. The clear solution was introduced, with stirring, into 900 parts of water. A mixture of 10.8 parts of ethylenediamine, component F), and 24.0 parts of water was then added to the dispersion, with stirring. Thereafter, the acetone was removed from the dispersion by distillation under a slight vacuum. A UV-curable, aqueous polyurethane dispersion 2) according to the invention having a solids content of 40 wt. %, a mean particle diameter of 53 nm, a pH value of 8.5 and a flow time of 79 seconds was obtained. The acid number of the polyurethane acrylate was 17.5. Reaction time to neutralisation: 5 hours.

3) Preparation of a UV-Curable, Aqueous Polyurethane Dispersion According to the Invention 339.9 parts of the polyester acrylate Laromer® PE 44 F (BASF AG, Ludwigshafen, DE), component A), 13.2 parts of 1,4-butanediol, component C), 199.7 parts of 4,4'-diisocyanatodicyclohexylmethane, component D), and 0.6 part of dibutyltin dilaurate were dissolved in 185 parts of acetone and reacted at 60° C., with stirring, to an NCO content of 4.3 wt. % (theory 4.04 wt. %). 26.7 parts of dimethylolpropionic acid, component E), were then added and reacted further at 60° C. to an NCO value of 2.1 wt. % (theory: 1.72 wt. %). Neutralisation was then carried out by adding and stirring in 19.4 parts of triethylamine. The clear solution was introduced, with stirring, into 900 parts of water. A mixture of 10.8 parts of ethylenediamine, component F), and 24.0 parts of water was then added to the dispersion, with stirring. Thereafter, the acetone was removed from the dispersion by distillation under a slight vacuum. A UV-curable, aqueous polyurethane dispersion 3) according to the invention having a solids content of 40 wt. %, a mean particle diameter of 76 nm, a pH value of 8.8 and a flow time of 18 seconds was obtained. The acid number of the polyurethane acrylate was 15.5. Reaction time to neutralisation: 5.5 hours.

4) Preparation of a UV-Curable, Aqueous Polyurethane Dispersion According to the Invention 339.9 parts of the polyester acrylate Laromer® PE 44 F (BASF AG, Ludwigshafen, DE), component A), 15.0 parts of 1,4-butanediol, component C), 199.7 parts of 4,4'-diisocyanatodicyclohexylmethane, component D), and 0.6 part of dibutyltin dilaurate were dissolved in 185 parts of acetone and reacted at 60° C., with stirring, to an NCO content of 4.1 wt. % (theory 3.81 wt. %). 24.0 parts of dimethylolpropionic acid, component E), were then added and reacted further at 60° C. to an NCO value of 2.1 wt. % (theory: 1.72 wt. %). Neutralisation was then carried out by adding and stirring in 19.4 parts of triethylamine. The clear solution was introduced, with stirring, into 900 parts of water. A mixture of 10.8 parts of ethylenediamine, component F), and 24.0 parts of water was then added to the dispersion, with stirring. Thereafter, the acetone was removed from the dispersion by distillation under a slight vacuum. A UV-curable, aqueous polyurethane dispersion 4) according to the invention having a solids content of 38 wt. %, a mean particle diameter of 84 nm, a pH value of 8.2 and a flow time of 13 seconds was obtained. The acid number of the polyurethane acrylate was 14.0. Reaction time to neutralisation: 5 hours.

5) Preparation of a UV-Curable, Aqueous Polyurethane Dispersion (Comparison)

339.9 parts of the polyester acrylate Laromer® PE 44 F (BASF AG, Ludwigshafen, DE), component A), 10.8 parts of 1,4-butanediol, component C), 30.3 parts of dimethylolpropionic acid, component E), 199.7 parts of 4,4'-diisocyanatodicyclohexylmethane, component D), and 0.6 part of dibutyltin dilaurate were dissolved in 185 parts of acetone and reacted at 60° C., with stirring, to an NCO content of 2.1 wt. % (theory 1.72 wt. %). Neutralisation was then carried out by adding and stirring in 19.4 parts of triethylamine, and 115.0 parts of the ethoxylated pentaerythritol tetraacrylate Miramer® 4004 (Rahn AG, Zurich, CH), component (ii), were added. The clear solution was introduced, with stirring, into 1035 parts of water. A mixture of 10.8 parts of ethylenediamine, component F), and 24.0 parts of water was then added to the dispersion, with stirring. Thereafter, the acetone was removed from the dispersion by distillation under a slight vacuum. A UV-curable, aqueous polyurethane dispersion 5) having a solids content of 39 wt. %, a mean particle diameter of 97 nm, a pH value of 8.7 and a flow time of 42 seconds was obtained. The acid number of the polyurethane acrylate was 17.5. Reaction time to neutralisation: 16 hours.

6) Preparation of a UV-curable, Aqueous Polyurethane Dispersion According to the Invention 339.9 parts of the polyester acrylate Laromer® PE 44 F (BASF AG, Ludwigshafen, DE), component A), 13.2 parts of 1,4-butanediol, component C), 199.7 parts of 4,4'-diisocyanatodicyclohexylmethane, component D), and 0.6 part of dibutyltin dilaurate were dissolved in 185 parts of acetone and reacted at 60° C., with stirring, to an NCO content of 4.3 wt. % (theory 4.04 wt. %). 26.7 parts of dimethylolpropionic acid, component E), were then added and reacted further at 60° C. to an NCO value of 2.1 wt. % (theory: 1.72 wt. %). Neutralisation was then carried out by adding and stirring in 19.4 parts of triethylamine, and 115.0 parts of the ethoxylated pentaerythritol tetraacrylate Miramer® 4004 (Rahn AG, Zurich, CH), component (ii), were added. The clear solution was introduced, with stirring, into 1035 parts of water. A mixture of 10.8 parts of ethylenediamine, component F), and 24.0 parts of water was then added to the dispersion, with stirring. Thereafter, the acetone was removed from the dispersion by distillation under a slight vacuum. A UV-curable, aqueous polyurethane dispersion 6) according to the invention having a solids content of 39 wt. %, a mean particle diameter of 86 nm, a pH value of 8.3 and a flow time of 20 seconds was obtained. The acid number of the polyurethane acrylate was 15.5. Reaction time to neutralisation: 5.5 hours.

7) Preparation of a UV-Curable, Aqueous Polyurethane Dispersion (Comparison)

396 parts of the polyester acrylate Laromer® PE 44 F (BASF AG, Ludwigshafen, DE), component A), 18.0 parts of 1,4-butanediol, component C), 199.7 parts of 4,4'-diisocyanatodicyclohexylmethane, component D), and 0.6 part of dibutyltin dilaurate were dissolved in 180 parts of acetone and reacted at 60° C., with stirring, to an NCO content of 2.8 wt. % (theory 2.75 wt. %). The prepolymer was then diluted further with 450 parts of acetone, and 78 parts of a 40% aqueous solution of PUD salt (Michael adduct of acrylic acid and ethylenediamine, sodium salt) were stirred in. After the exothermic reaction had subsided, 900 parts of water were introduced into the clear solution, with stirring. The dispersion is extremely viscous and cannot be distilled. The viscosity of the dispersion does not become low even overnight.

8) Preparation of a UV-Curable, Aqueous Polyurethane Dispersion (Comparison)

396 parts of the polyester acrylate Laromer® PE 44 F (BASF AG, Ludwigshafen, DE), component A), 18.0 parts of 1,4-butanediol, component C), 199.7 parts of 4,4'-diisocyanatodicyclohexylmethane, component D), and 0.6 part of dibutyltin dilaurate were dissolved in 180 parts of acetone and reacted at 60° C., with stirring, to an NCO content of 2.8 wt. % (theory 2.75 wt. %). The prepolymer was then diluted further with 450 parts of acetone, and 86 parts of a 45% aqueous solution of AAS salt (2-(2-amino-ethylamino)-ethanesulfonic acid sodium salt) were stirred in. After the exothermic reaction had subsided, 900 parts of water were introduced into the clear solution, with stirring. The dispersion immediately settles out completely.

Example 2) according to the invention shows that, with the same acid number, that is to say the same hydrophilisation, the UV-PUD is more finely divided than in Comparison Example 1). According to the very small mean particle diameters in Example 2), the viscosity is very high. In Examples 3) and 4) according to the invention, the delayed addition of dimethylolpropionic acid, component E), as compared with Example 2), was retained but the amount of component E) was reduced twice. The resulting UV-PUDs are again more finely divided than in Example 1), but the viscosity falls drastically as the acid number falls.

Example 6) according to the invention, in comparison with Example 5), shows that the delayed addition of the dimethylolpropionic acid and the reduction in the amount of dimethylolpropionic acid yield a more finely divided and at the same time less viscous UV-PUD.

Examples 2), 3), 4) and 6) show, in comparison with Examples 1) and 5), a markedly shorter reaction time.

Examples 7) and 8) show that hydrophilisation with amine-functionalised carboxylic acids or sulfonic acids is not suitable for hydrophilising UV-PUDs according to the invention. Even a variation in the amount of hydrophilising agent yields similar results. Such hydrophilising agents are shown to have low usability for UV-PUDs.

The invention claimed is:

1. A process for preparing a radiation-curable, aqueous dispersion comprising a polyurethane acrylate (i) comprising as structural components
  A) one or more polymeric compounds selected from the group consisting of polyester (meth)acrylates, polyether (meth)acrylates, polyether ester (meth)acrylates, unsaturated polyesters having allyl ether structural units, and polyepoxy (meth)acrylates, wherein the one or more polymeric compound has an OH number in the range from 15 to 300 mg KOH/g of substance;
  B) optionally one or more monomeric compounds other than A) comprising a hydroxy function and at least one (meth)acrylate group;
  C) one or more monomeric monools, diols and/or triols, other than A) or B), in each case having a molecular weight of from 32 to 240 g/mol or polyesters, polycarbonates, polyether carbonate polyols, C2-, C3- and/or C4-polyethers, polyether esters, polycarbonate polyesters having a functionality of from 1.0 to 3.0, in each case having a weight-average molar mass Mw in the range from 300 to 4000 g/mol and being other than A) or B);
  D) one or more organic polyisocyanates selected from the group consisting of 1,6-hexamethylene diisocyanate, 1-isocyanato-3,3,5-trimethyl-5-isocyanatomethylcyclohexane (isophorone diisocyanate or IPDI) and 4,4'-diisocyanatodicyclohexylmethane;
  E) one or more compounds selected from the group consisting of dimethylolpropionic acid and dimethylolbutyric acid;
  F) one or more compounds selected from the group consisting of mono-amines, di-amines, mono-functional amino alcohols and difunctional amino alcohols;
  wherein components A) through D) are reacted in a first reaction step to form a polyurethane acrylate which comprises neither ionic nor potentially ionic groups and, after determination of the NCO content, an NCO value is reached which is within 1.5 wt. % NCO (absolute) of the theoretical NCO content, wherein the molar ratio of isocyanate groups in D) to groups reactive towards isocyanates in A) to C) is from 1.2:1.0 to 4.0:1.0; and
  in a second reaction step, component E) is reacted with free NCO groups from the reaction product of components A) to D) and, after again determining the NCO content, an NCO value is reached which is within 1.5 wt. % NCO (absolute) of the theoretical NCO content, wherein the molar ratio of isocyanate groups in D) to groups reactive towards isocyanates in A), B), C) and E) is from 1.2:1.0 to 1.5:1.0, wherein a neutralising agent is added during or after the second reaction step; and in a third reaction step, component F) is reacted with free NCO groups, wherein a dispersing step is carried out after the second step or, if the neutralisation is carried out after the second step, after neutralisation, achieved by addition of water to the urethane acrylate or by addition of the urethane acrylate to water, a chain extension by means of component F) taking place in a third reaction step before, during or after the dispersion.

2. The process of claim 1, wherein one or more reactive diluents comprising at least one radically polymerizable group, component (ii), are added.

3. The process of claim 1, wherein component E) is dimethylolpropionic acid.

4. The process of claim 1, wherein, after the first reaction step, after determination of the NCO content, an NCO value is reached which is within 1.0 wt. % NCO (absolute) of the theoretical NCO content, and after the second reaction step, after determination of the NCO content, an NCO value is reached which is within 1.0 wt. % NCO (absolute) of the theoretical NCO content.

5. The process of claim 1, wherein component A) is selected from the group consisting of a polyester (meth) acrylate and a polyether ester (meth)acrylate.

6. The process of claim 5, wherein the molar ratio of isocyanate groups in D) to groups reactive towards isocyanates in A) to C) is from 1.5:1.0 to 3.0 to 1:0.

7. The process of claim 1, wherein component C) is a monomeric monool, diol and/or triol in each case having a molecular weight of from 32 to 240 g/mol.

8. The process of claim 1, wherein component A) is selected from the group consisting of a polyester (meth) acrylate and a polyether ester (meth)acrylate; and component C) is a monomeric monool, diol and/or triol in each case having a molecular weight of from 32 to 240 g/mol.

9. The process of claim 8, wherein the molar ratio of isocyanate groups in D) to groups reactive towards isocyanates in A) to C) is from 1.5:1.0 to 3.0 to 1:0.

10. The process of claim 1, wherein the molar ratio of isocyanate groups in D) to groups reactive towards isocyanates in A) to C) is from 1.5:1.0 to 3.0 to 1:0.

11. A radiation-curable, aqueous dispersion comprising a polyurethane acrylate (i) prepared by the process of claim 1.

12. A coating, lacquer, or adhesive comprising the radiation-curable, aqueous dispersion comprising a polyurethane acrylate (i) of claim 11.

13. A process for preparing a radiation-curable, aqueous dispersion comprising a polyurethane acrylate (i) comprising as structural components A) is selected from the group consisting of polyester (meth)acrylate and polyether ester (meth)acrylate, wherein the one or more polymeric compound has an OH number in the range from 15 to 300 mg KOH/g of substance;

B) optionally one or more monomeric compounds other than A) comprising a hydroxy function and at least one (meth)acrylate group;

C) is a monomeric monool, diol and/or triol, other than A) or B), in each case having a molecular weight of from 32 to 240 g/mol;

D) one or more organic polyisocyanates selected from the group consisting of 1,6-hexamethylene diisocyanate, 1-isocyanato-3,3,5-trimethyl-5-isocyanatomethylcyclohexane (isophorone diisocyanate or IPDI) and 4,4'-diisocyanatodicyclohexylmethane;

E) one or more compounds selected from the group consisting of dimethylolpropionic acid and dimethylolbutyric acid;

F) one or more compounds selected from the group consisting of mono-amines, di-amines, mono-functional amino alcohols and difunctional amino alcohols wherein components A) through D) are reacted in a first reaction step to form a polyurethane acrylate which comprises neither ionic nor potentially ionic groups and, after determination of the NCO content, an NCO value is reached which is within 1.5 wt. % NCO (absolute) of the theoretical NCO content, wherein the molar ratio of isocyanate groups in D) to groups reactive towards isocyanates in A) to C) is from 1.2:1.0 to 4.0:1.0; and in a second reaction step, component E) is reacted with free NCO groups from the reaction product of components A) to D) and, after again determining the NCO content, an NCO value is reached which is within 1.5 wt. % NCO (absolute) of the theoretical NCO content, wherein the molar ratio of isocyanate groups in D) to groups reactive towards isocyanates in A), B), C) and E) is from 1.2:1.0 to 1.5:1.0, wherein a neutralising agent is added during or after the second reaction step; and in a third reaction step, component F) is reacted with free NCO groups, wherein a dispersing step is carried out after the second step or, if the neutralisation is carried out after the second step, after neutralisation, achieved by addition of water to the urethane acrylate or by addition of the urethane acrylate to water, a chain extension by means of component F) taking place in a third reaction step before, during or after the dispersion.

* * * * *